United States Patent
Wu et al.

(10) Patent No.: US 6,202,204 B1
(45) Date of Patent: *Mar. 13, 2001

(54) COMPREHENSIVE REDUNDANT LOAD ELIMINATION FOR ARCHITECTURES SUPPORTING CONTROL AND DATA SPECULATION

(75) Inventors: Youfeng Wu, Palo Alto; Yong-Fong Lee, San Jose, both of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,755

(22) Filed: Mar. 11, 1998

(51) Int. Cl.$^7$ .................................................. G06F 9/45

(52) U.S. Cl. ...................................... 717/9; 717/8; 717/11

(58) Field of Search .................................. 395/707, 708, 395/709, 706; 364/148.01, 154; 717/8, 9, 11

(56) References Cited

U.S. PATENT DOCUMENTS

| | | | |
|---|---|---|---|
| 5,293,631 | * 3/1994 | Rau et al. ............................. | 395/707 |
| 5,526,499 | * 6/1996 | Bernstein et al. .................... | 395/392 |
| 5,537,620 | * 7/1996 | Breternitz, Jr. ...................... | 395/709 |
| 5,542,075 | * 7/1996 | Ebcioglu et al. ........................ | 717/9 |
| 5,555,412 | * 9/1996 | Besaw et al. .............................. | 717/8 |
| 5,704,053 | * 12/1997 | Santhanam ........................... | 712/207 |
| 5,751,983 | * 5/1998 | Abramson et al. .................. | 712/216 |
| 5,787,285 | * 7/1998 | Lanning .................................... | 717/4 |
| 5,797,013 | * 8/1998 | Mahadevan et al. ................... | 717/9 |
| 6,029,005 | * 2/2000 | Radigan ................................... | 717/9 |

OTHER PUBLICATIONS

Austin et al, "Zero cycle loads: Microarchitecture support for reducing load latency", IEEE pp. 82–92, 1995.*

Jegou et al, "Speculative Prefetching", ACM ICS, pp 57–66, 1993.*

Bodik et al, "Path sensitive value flow analysis", ACM POPL pp 237–251, 1998.*

Molina et al, "Dynamic removal of redundant computations", pp 474–481, 1999.*

Shavit et al, "Eliminiation trees and the constructions of pools and stacks", ACM SPAA, pp 54–63, 1998.*

Diwan et al., "Type based alias analysis", ACM SIGPLAN, pp 106–117, Apr., 1998.*

Schlansker et al., "Height reduction of control recurrence for ILP processor", MICRO 27 ACM, pp 40–51, Mar., 1994.*

Shavit et al., "Elimination trees and the construction of pools and stacks", SPAA ACM, pp 54–63, 1995.*

Mahlke et al., "Sentinel scheduling a model for compiler controlled speculation execution", ACM Trans. Comp. Sys. vol. 11, No. 4, pp 376–408, Nov., 1993.*

(List continued on next page.)

*Primary Examiner*—Kakali Chaki
*Assistant Examiner*—Anil Khatri
(74) *Attorney, Agent, or Firm*—Alan K. Aldous

(57) ABSTRACT

In one implementation of the invention, a computer implemented method used in compiling a program includes identifying a covering load, which may be one of a set of covering loads, and a redundant load. The covering load and the redundant load have a first and second load type, respectively. The first and the second load type each may be one of a group of load types including a regular load and at least one speculative-type load. In one implementation, the group of load types includes at least one check-type load. One implementation of the invention is in a machine readable medium.

35 Claims, 4 Drawing Sheets

OTHER PUBLICATIONS

Lo et al., "Register promotion by sparse partial redundancy elimination of loads and stores", SIGPLAn ACM, pp 26–37, Apr., 1998.*

Rogers et al., "Software support speculative loads", ASPLOS V ACM, pp 38–50, 1992.*

A. Aho et al., "Compilers: Principles, Techniques, and Tools," (Addison Wesley 1986), pp. 554–555, 592–595, and 627–631.

V. Kathail et al., "HPL Playdoh Architecture Specification: Version 1.0," HP Laboratories Technical Report, HPL–93–80, Feb. 1994, pp. 1–37 and 39–48.

* cited by examiner

US 6,202,204 B1

COMPREHENSIVE REDUNDANT LOAD ELIMINATION FOR ARCHITECTURES SUPPORTING CONTROL AND DATA SPECULATION

BACKGROUND OF THE INVENTION

1. Technical Field of the Invention

The present invention relates to compilers and, more particularly, to compilers that performs redundant load elimination.

2. Background Art

A compiler is a program that reads a source program written in a source language and translates it into a target program in a target language. For example, a compiler may translate a high level source program (such as C++) into compiled code that can be understood by a processor, such as a microprocessor.

Many compilers include three stages: (1) a "front end" in which the source program is translated into intermediate representations; (2) a "middle end" in which machine independent optimizations are made; and (3) a "back end" in which machine dependent optimizations are made and code is generated. Optimizations can significantly improve running time and/or space requirements of the target program. However, "optimized" code is not necessarily optimal under any mathematical measure.

Techniques for improving the target code include local optimization, peephole optimization, and global optimization. Local optimization works on individual blocks of a function. Peephole optimization examines a short sequence of the target instructions (called the peephole) and, if possible, replaces it by a shorter and/or faster sequence. Global optimization operates over the entire function.

Redundant load elimination attempts to remove load operations that are redundant. A load is redundant if it loads a value from a memory location from which an earlier load already obtained its value and the value is still valid (that is, no store writes into the same memory location in-between). Redundant load elimination can be implemented as local, peephole, or global optimization. However, traditional redundant load elimination involves only regular loads, not more complicated load types.

Accordingly, there is a need for a compiler to handle other types of loads as well in redundant load elimination.

SUMMARY OF THE INVENTION

In one implementation of the invention, a computer implemented method used in compiling a program includes identifying a covering load, which may be one of a set of covering loads, and a redundant load. The covering load and the redundant load have a first and second load type, respectively. The first and the second load type each may be one of a group of load types including a regular load and at least one speculative-type load. In one implementation, the group of load types includes at least one check-type load. One implementation of the invention is in a machine readable medium.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figures 1, 2:
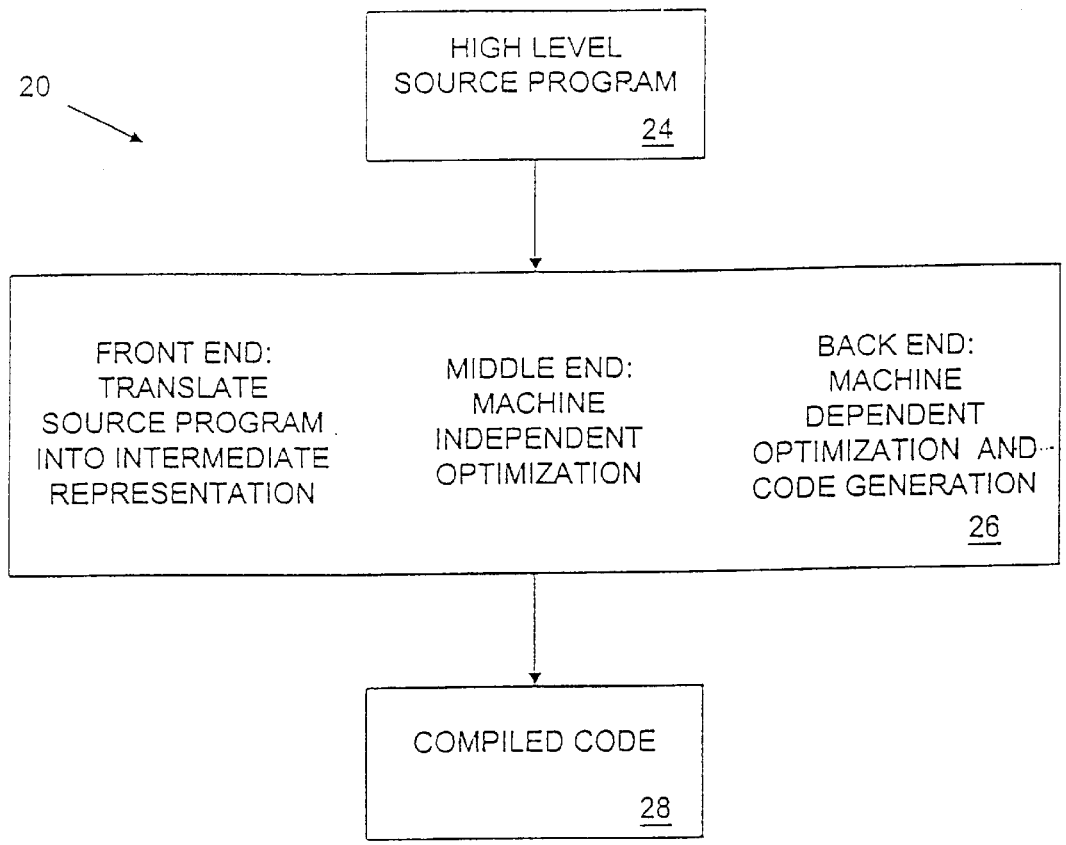
FIG. 1 is a block diagram representation of a computer system including memory and a processor that may be used to perform compilation.
FIG. 2 is a flow diagram illustrating major features typically used in compilation from a high level source program to complied code.

Referring to FIG. 1, a computer system 10 includes memory 14 and a processor 16, which executes a compiler to compile a program in memory 14. Memory 14 holds the program to be compiled, intermediate forms of the program, and a resulting compiled program. Memory 14 is intended as a generalized representation of memory and may include a variety of forms of memory, such as a hard drive, CD-ROM, and random access memory (RAM) and related circuitry.

There are various ways in which a program may be compiled. However, many compilation techniques can be characterized as in a flow chart 20 of FIG. 2. Referring to FIG. 2, a high level source program is represented in block 24. The source program may be held in memory 14. As represented in block 26, in a "front end" of the compilation, the source program is translated into intermediate representations. In a "middle end" of the compilation, machine independent optimizations are made. In some situations, there may also be some machine dependent optimizations made in the middle end. In a "back end" of the compilation, machine dependent optimizations are made and code is generated. Compiled code is represented in block 28. The present invention is not restricted to a compiler that follows the outline of FIG. 2.

As examples, the back end may include loop transformation, speculation, instruction level parallelism (ILP) transformation, software pipelining, predication, global scheduling, register allocation, and code generation. In certain implementations, the load elimination described herein may occur before register allocation and, more beneficially, between global scheduling and register allocation.

Figures 3, 4:
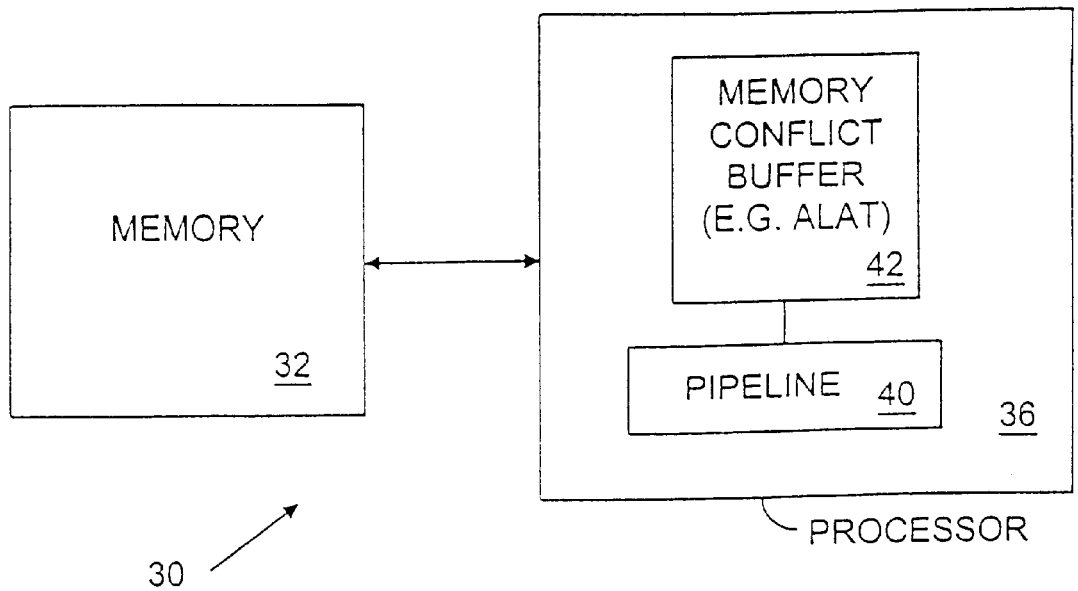
FIG. 3 is a block diagram representation of a computer system to execute the program compiled by the processor of FIG. 1.
FIG. 4 is a graphical illustration of a memory conflict buffer of FIG. 3.

FIG. 3 illustrates a computer system 30 including a memory 32 and a processor 36, which executes the program that is compiled in computer system 10. Memory 32 is intended to be a generalized representation of memory and may include, for example, a hard drive, CD-ROM, and RAM and related circuitry. Computer system 30 may perform control speculation and data speculation, described below. As an example, computer system 30 includes a pipeline 40 and a memory conflict buffer 42 of which an Advanced Load Address Table (ALAT) is an example. Of course, processor 36 would include various other elements. Computer systems 10 and 30 may be identical or different. (Depending on the implementation, computer system 10 could also execute the program it compiles, and computer system 30 could also compile the program it executes.) The present invention concerns compiling, not execution. However, the compiler compiles the programs such that they can be executed in computer systems that include some sort of memory conflict buffer and support control speculation and data speculation.

There may be substantial latency in loading from memory 32 to a register in processor 36. To avoid the latency, computer system 30 may perform speculative loads. However, the speculation is sometimes incorrect. In that case, recovery will be performed by the computer system 30 as prescribed by the executable program. A compiler can aggressively utilize control and data speculation to significantly increase instruction-level parallelism in the compiled program. Aggressive speculation may generate many speculative (control speculative) and advanced (data speculative) loads with the same addresses. The following are six types of loads: regular load, advanced load, check load, check advanced load, speculative load, and speculative advanced load. Advanced load, check advanced load, speculative load, and speculative advanced load are examples of speculative-type loads. Check load and check advanced load are examples of check-type loads. Note that the check advanced load is an example of both a speculative-type load and a check-type load. In the following detailed description and claims, the words "speculative" and "speculation" are used in connection with control speculation and data speculation, and in connection with particular types of loads and a group of loads (called speculative-type loads). However, in the detailed description and claims, it is clear in which context the word speculation or speculative is used.

The compiler may eliminate some or all redundant loads. The present invention includes comprehensive redundant load elimination. Comprehensive redundant load elimination involves code (e.g., routines) that eliminate each of the six load types: regular load, advanced load, check load, check advanced load, speculative load, and speculative advanced load. Other redundant load elimination methods under the invention do not handle all six types of loads. When considering code correctness and efficiency, a compiler should not straightforwardly apply traditional redundant load elimination to handling redundant loads involving more complicated loads. Doing so would lead to incorrect and/or inefficient code. An implementation of the invention includes a global approach that attempts to remove redundant loads throughout an entire function.

Throughout this specification, when reference is made to "one implementation" or "an implementation" or the like, it means "at least one implementation" of the invention. Different references to "one implementation" or "an implementation," or the like are not necessarily all referring to the same implementation.

A. Types of Speculation

1. Control speculation

When a load operation is under a condition, it is not safe to execute it unconditionally. Control speculation converts the conditional load to a speculative load (spec_load) that defers exceptions that may occur, and adds a speculative check (spec_check) operation to detect the deferred exception. The speculative load can be executed unconditionally. When execution generates an exception, the exception is deferred. The exception may be encoded in one or more bits of the destination register (also called the result or target register). The destination register can be used in other exception deferring operations. The speculative check operation is at the original location of the load, and when it detects the deferred exception, an exception handler is activated. The spec_check operation takes as the operand register, a register which may contain the deferred exception information. The register may be the destination register of the corresponding speculative load or the result of an operation that uses a register with a deferred exception.

In Example 1, the conditional load is converted to a speculative load followed by a speculative check operation (i.e., the left side of Example 1 illustrates code without control speculation and the right side illustrates code with control speculation). The speculative load is executed unconditionally in this example.

EXAMPLE 1

Control speculation

| if (condition) | reg = spec_load x; |
| reg = load x; → | if( condition) |
| | spec_check reg |

Note that in the various examples in the specification, the code includes pseudo code. Further note that there may be instructions (not shown) between the if and spec_load statements. In the examples provided below there may also be instructions that are not shown. A speculative load or advanced load may be several or many instructions before a condition or store to overcome the latency involved with a load. However, the present invention involves eliminating redundant loads, not determining how far from a condition or store a speculative or advanced load should be positioned.

2. Data Speculation

Data speculation allows speculative execution of a load before an aliased stores or stores. The original load is replaced by an advanced load (adv_load) and a check load (check_load). The advanced load can be moved before the potentially aliased stores. The check load stays in the original location of the load, acting like a conditional load. The check load checks whether the value accessed by the corresponding advanced load is still valid. A memory conflict buffer (e.g., ALAT) may be used for this purpose. If the load is not valid, the check load reloads the value. Another flavor of check load operation is the check advanced load (check_adv_load). Check advanced load is the same as check load except the reload is also an advanced load (this is useful for speculating a load out of a loop). The check load uses the destination register name (and may also use the load address) to match the corresponding advanced load. So the advanced load and the check load have the same destination register name.

In Example 2, the code on the right side is transformed so as to move a load before an aliased store. In Example 2, p and q represent arbitrary registers (in some situations, they could be the same register). The memory location addresses for the load and store are specified by the values contained in registers p and q. If the values in p and q are the same, then there may need to be a reload.

EXAMPLE 2

Data speculation

| store reg *p | reg1 = adv_load *q |
| reg1 = load *q; → | store reg *p |
| | reg1 = check_load *q |

A more aggressive data speculation allows moving the operations depending on the advanced load before stores. In this case, a conditional load is not enough to recover from invalidated load speculation. Instead, an advanced load check (adv_load_check) is used. If the advanced load is invalidated, the advanced load check operation branches to a recovery block and performs the load and all the necessary dependent operations.

In Example 3, the code on the left is without speculation and the code on the right illustrates an example of data speculation of a load and its uses.

EXAMPLE 3

Data speculation of load and uses

| | |
|---|---|
| store reg *p | reg1 = adv_load *q |
| reg1 = load *q; | reg2 = use reg1 |
| reg2 = use reg1 | store reg *p |
| → | adv_load_check reg1, *q, recover_blk |
| | Lab: . . . |
| | recover_blk: |
| |    reg1 = load *q |
| |    reg2 = use reg1 |
| |    go to Lab; |

Note that the adv_load_check line in Example 3 is a potential branch, not a load, and is not eliminated by the implementations described in detail below.

3. Mixed Data and Control Speculation

An implementation of a compiler according to the present invention may control speculate an advanced load, or data speculate a speculative load. The result of both is a speculative advanced load (spec_adv_load). A speculative advanced load may be defined such that if the load generates a deferred exception, the corresponding ALAT entry is invalidated. Thus a check_load or an adv_load_check operation is sufficient to check for both load invalidation and deferred exception. Note that a check_load or an adv_load_check can re-generate the deferred exception by repeating the load so there is no need to pass an exception identity from the speculative advanced load to the check load. In example 4, the conditional load is converted to a speculative advanced load followed by a check load operation. The speculative advanced load is executed before the store unconditionally in this example.

EXAMPLE 4

Mixed Data and Control Speculation

| | |
|---|---|
| If (condition) | reg = spec_adv_load *p; |
|   store *q | if (condition) |
|   reg = load *p; → |   store *q |
| |   reg = check_load *p |

4. Memory Conflict Buffer

Referring to FIG. 4, an example of ALAT 42 includes at least three fields. A destination register number field holds an identification for the destination register in processor 36. A memory address field holds all or part of the memory address (e.g., physical or virtual). A valid field holds one or more bits that represents when an advanced load has occurred that has not been invalidated, and when it is invalidated (e.g., by a store, ALAT conflict, or a semaphore). The right side of example 2 is used as an example. In the line of code, reg1=adv_load *q, a number representing reg1 is the destination register number and the contents of register q is the memory address. The details of the ALAT are implementation specific. In one implementation, the valid bit is initially set to 1 in response to the line of code reg1=adv_load *q, meaning that a store is not made to the same address and the advance load is valid (insofar as is then known). If the address of store reg *p is the same as in adv_load *q, the valid bit is changed to a 0, meaning the value accessed by the advanced load is invalid. With the valid bit equal to 0, the check-load reloads from *q. By contrast, if the address of store reg *p is different from that of adv_load *q, the valid bit would remain 1, and the check_load *q would not involve a reload.

In one implementation of the ALAT, only one entry is allocated for a destination register, regardless of how many loads are involved with that register. In another implementation, more than one destination register entry may be made for the same destination entry, provided a different address is involved. The ALAT may be fully associative, set associative, or direct mapped. In one implementation of the ALAT, the ALAT also includes an access size field (indicating the size of the region of memory being read) and a register type field (general or floating point). The type may be used with the destination register number as an index into the ALAT. The size, organization, matching algorithm and replacement algorithm of the ALAT are implementation specific. In one implementation, store and semaphore instructions search all entries in the ALAT using the address and size of the region of memory being written, and all entries corresponding to overlapping regions are invalidated (e.g., a 0 is placed in the valid field). An adv_check_load changes the valid bit from 0 to 1.

The invention is not restricted to any particular implementation of the ALAT. From the following examples, enough information is given for one skilled in the art to implement the invention to compile code for use by processors having ALATs or other memory conflict buffers. Of course, to some extent, details of the compiler depend on details of the memory conflict buffer.

5. Summary of Load Operations

The following are six types of loads: a regular load, advanced load, check load, check advanced load, speculative load, and speculative advanced load. Advanced load, check advanced load, speculative load, and speculative advanced load are examples of speculative-type loads. Check load and check advanced load are examples of check-type loads. Note that the check advanced load is an example of both a speculative-type load and a check-type load.

Example 5 summarizes examples of syntax and semantics for the six types of load operations as well as for a speculative check operation. Other implementations may be used.

EXAMPLE 5

Loads

| Type | Syntax | Semantics |
|---|---|---|
| Regular load | r = load address | load the value in address to r |
| Advanced load | r = adv_load address | Load the value in address to r and enter an ALAT entry. |
| Check load | r = check_load address | Check the ALAT entry. If the entry in invalidated, perform a regular load. If the ALAT entry is not allocated, reload to generate the deferred exception. |
| Check advanced load | r = check_adv_load address | Check the ALAT entry. If the entry in invalidated, perform an advanced load<br>r = adv_load address |
| Speculative load | r = spec_load address | Load the value in address to r. If an exception occurs, defer the exception handling by propagating the exception identity in register r. |
| Speculative advanced load | r = spec_adv_load address | Same as advanced load, except that when an exception occurs, it also defers exception handling by not allocating an ALAT entry. |

A speculative check is not a load, but following the pattern of Example 5, a syntax for a speculative check is r=spec_check r, and semantics for speculative check include "Check r and if r contains a deferred exception, raise the exception."

In some implementations of the invention, for compiler generated load operations for data and control speculation, the following conditions are observed.

1. A check load may have multiple corresponding advanced loads and an advanced load may have multiple check loads. They all should define the same destination register. The destination register helps a check load to identify the corresponding advanced load. Also, the set of advanced loads should collectively dominate the set of check loads. Otherwise when control reaches the check load via a path not covered by an advanced load, the check load will always incur recovery overhead.

2. A speculative check may correspond to multiple speculative loads and a speculative load may correspond to multiple speculative checks. The set of speculative loads should collectively dominate the speculative checks. Otherwise when control reaches one of the speculative checks via a path not covered by a speculative load, an unexpected exception may be raised.

If a speculative load is eliminated, the corresponding speculative check may be eliminated. A speculative check should not be eliminated unless all associated speculative loads are eliminated.

B. Redundant Load Elimination

Because the semantics of speculative-type loads and check-type loads are different from that of a regular load, the traditional redundant load elimination may not be used to eliminate them. Example 6 contains a code segment, resulting from optimization that uses control and data speculation.

EXAMPLE 6

Code sequence with redundant load due to speculation

```
1.  r1 = load *(compptr + 4)
2.  r2 = load buffer[ci]
3.  cmpy index, r1
4.  jgeq OUTSIDE_2
5.  r2 = adv_load buffer[ci]
6.  r3 = r2 + yoffset
7.  r4 = spec_adv_load *ceof
8.  r5 = spec_adv_load *compptr
9.  r1 = spec_load *(compptr + 4)
10. . . .
```

The second load (to r2) accesses the same memory location as the load on the fifth line, and there is no store between them. Traditional redundant load elimination might suggest that the load on the fifth line be removed. However, doing so could severely degrade program performance, especially when the check_load corresponding to the advanced load is inside a loop. The reason is that the regular load does not enter an entry into the ALAT buffer. So the check load will redo a load each time it is executed. Also, the performance problem should not be resolved by simply removing the check load operation. Otherwise the program may behave incorrectly. This is because the value of the advanced load may be aliased with a store and the check load re-executes the load in case the store invalidates the load.

Similarly, the last load (line 9) in the above code accesses the same location as the first load, and there is no store between the two loads. However, the last load should not simply be removed in the above code because the spec_load has a corresponding spec_check later in the rest of the program. If the spec_load is not needed, its corresponding check load should be removed as well.

C. Comprehensive Redundant Load Elimination

The invention involves available loads analysis to identify redundant loads and program transformations to remove these redundant loads.

1. Available Loads Analysis

One implementation of an available loads analysis is a global data flow analysis performed over an entire function. It indicates which load expressions are redundant in the function. Ld[reg] is a load expression used to represent any type of load in this section. The following describes one technique of global data flow analysis, but the invention is not limited to it. A load expression ld[reg] is available ("available load expression") at some program point if and only if along every execution path to the program point, ld[reg] is executed at least once, and after it is executed reg is not redefined and there is no store operation to the same location. Therefore, a load expression ld[reg] at a program point is redundant if and only if it is already available at that program point.

The technique works on the control flow graph of a function. It performs a global data flow analysis called the "Available Loads" (AVLD) analysis to detect redundant loads in the function. In the formulation, a load expression in the following instruction L L: r2=ld[r1]

is redundant if, on every path from the START block (also called a node) of the control flow graph to L, there exists another load L2

L2: r3=ld[r1]

such that r1 is not redefined/killed between L2 and L. (Note that L and L2 may have the same or different destination registers. That is, r2 may or may not be equal to r3.) There may be different L2's on different paths from START to L. The load expression in L is redundant since the value loaded by L2 can be used correctly as the value loaded by L.

For each block n in the control flow graph, the AVLD(n) is defined to be a set of available load expressions reaching the entry of n as in equations (1) and (2) as follows:

$$AVLD(START) = \Phi \quad (1)$$

$$AVLD(n) = \bigcap_{\forall m \in pred(n)} ((AVLD(m) \cap PRES(m)) \cup GEN(m)) \quad (2)$$

where pred(n) represents the set of immediate predecessors of n. A load expression ld[r1] is preserved in block m, denoted by PRES(m), if there is no definition of r1 in m and there is no store to the same memory location after the load. A load expression ld[r1] is generated in block m, denoted by GEN(m), if there is a downward exposed load expression ld[r1] in m. A load expression ld[r1] is downward exposed in block m if from the load to the exit of block m, there is no definition of r1 and no store to the same memory location.

The resulting AVLD information indicates which load expressions are available at the entry of each basic block. This information can then be propagated within individual basic blocks to identify which load expressions are available when the program executes up to a particular instruction I. If I is a load instruction and its load expression is available right before I is executed, then I contains a redundant load expression, which can be removed or replaced by a lower-latency instruction (e.g., a move). A redundant load is a load instruction containing a redundant load expression.

Once a load instruction L is identified to be redundant, a set of earlier "covering" load instructions (herein called "covering loads") can be identified that together make L redundant. Covering loads are dominating loads. For a redundant load L, there exists a set of one or more "covering" loads that together make L redundant. When the program execution reaches L, it has gone through a covering load of L such that the covering load accesses the same value from the same memory location as L does. If this set contains only one load, the program transformation needed to remove L is relatively simple and is presented in the next section. If this covering set consists of multiple loads, there are two cases to consider. First, when the multiple loads are of the same load type, the elimination of the redundant load can be handled in a way similar to the case when the covering set has only one load. Second, when these multiple loads are of different load types, the program transformation is more complex, except for the cases where L is a regular load. In some implementations and circumstances, some redundant loads may be allowed to exist in the compiled program because, for example, it is believed that the particular type of redundant load is rare and eliminating the redundant load would be excessively complicated.

Figure 5:
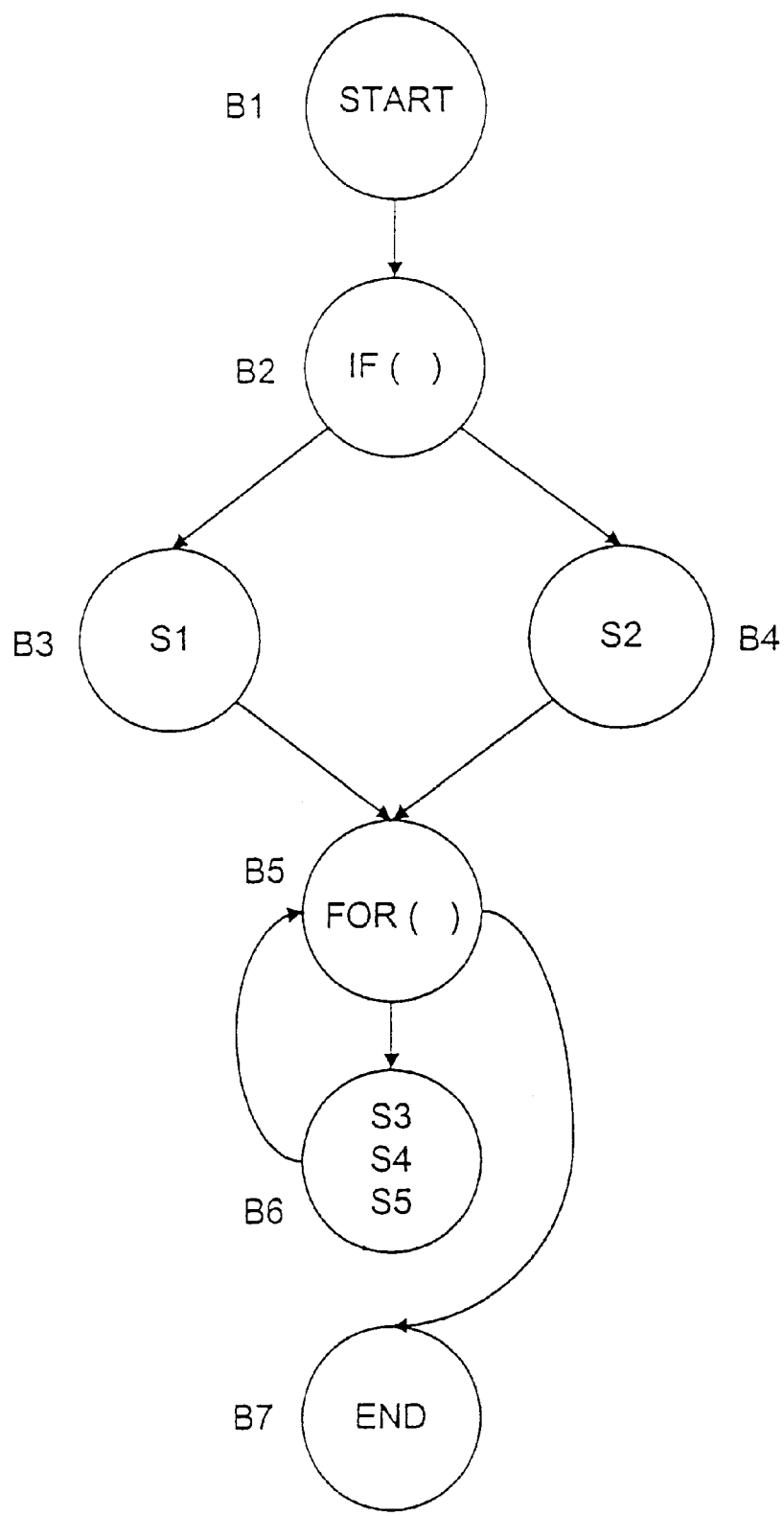
FIG. 5 is a control flow graph illustrating an example of available loads analysis.

As an example, FIG. 5 illustrates a control flow graph corresponding to function A:

```
func A( )
{
    if( ) {S1}
    else {S2}
    for ( )
    {
        S3
        S4
        S5
    }
}
```

With reference to FIG. 5 and the preceding sample code, in equation (1) the start block is block B1. As an example, in equation 2, assuming n=block B5, the pred of block B5 is blocks B3, B4, and B6 (i.e., m=B3, B4, and B6). Assume that statements S1, S2, S3, S4, and S5 are each loads (there may be other statements not shown that are not loads). The available load expressions identified by equation (2) may change as the analysis advances through statements S3, S4, and S5. For example, a load expression might not be preserved (e.g., be killed). Therefore, the available loads analysis propagates through the blocks so that it is known which load expressions are available (and therefore which are redundant) at any stage of the function.

The available loads analysis may or may not identify each of the six types of loads listed in Example 5. A comprehensive available loads analysis is a type of available loads analysis that does handle all six types of loads.

2. Transformation

For each redundant load L, an appropriate program transformation may be performed according to the load type of L and the types of loads that cause L to be redundant. Given the six types of loads considered, the transformation can be very complicated. This is a major reason why one cannot straightforwardly apply traditional redundant load elimination to the problem under consideration here.

The outline of a comprehensive redundant load elimination algorithm (CRL_Elim) according to one implementation of the invention is shown in Example 7. CRL_Elim( ) may be called between global scheduling and register allocation or at some other part of the compilation. Comprehensive_Available_Load_Analysis( ) is an available loads analysis that handles all six types of loads. Below covering (ld) represents the set of covering loads for a load ld, which is the load to be eliminated.

EXAMPLE 7

Comprehensive redundant load elimination

```
CRL_Elim( )
    Comprehensive_Available_Load_Analysis( );
    For each redundant load ld, find its covering loads covering(ld)
    Do_Elimination (covering(ld), ld);
```

In one implementation, the set of covering loads is determined by considering the results of the available loads analysis and the code being compiled. The routines provided as examples below involve one covering load (ld1) and one redundant load (ld2). Where there are multiple redundant loads identified in a function, there are various approaches in determining which loads to consider at a time. For example, under one implementation, the load elimination begins with the redundant load highest in program order (i.e., coming closest to the beginning of the function) and works toward the end of the function. Under another implementation, the load elimination begins with the redundant load lowest in program order and works toward the beginning of the function. Other implementations may be used.

For simplicity, in the following examples, it is assumed there is only one covering load (ld1). Further, in one implementation, the set of covering loads (whether one or more) is not passed as an argument through the Do_Elimination function. The information regarding covering loads can be conveyed through other means. Further, even if there is more than one load instruction in the set of covering loads, a single one of the load instructions can be processed with the redundant load at a time. That is, the other covering loads can be handled later. There are various ways in which the invention can be implemented.

There are at least two techniques by which a redundant load may be eliminated. First, the redundant load may be completely eliminated from the code (as in Example 11). Second, the redundant load may be eliminated from its position in the code and moved to another position in the code, which also involves an elimination of a covering load ld1 (as in Example 12). There are different perspectives for viewing the second technique. From one viewpoint, under the second technique, the redundant load is moved and the covering load is eliminated. From another viewpoint, under the second technique, the redundant load is eliminated and the covering load is modified. Under either perspective, the redundant load is eliminated by no longer being in its position and there is one fewer load in the code.

Example 8 is an example of Do_Elimination (ld1, ld2) and related code.

EXAMPLE 8

Do_Elimination routine

```
Enum loadType = { regular load, advanced load, check load, check
advanced load, speculative load, speculative advanced load };
Enum loadType load_type(load) { return the type of load }
Do_Elimination (ld1, ld2)
    routine_name =CLM(load_type(ld1), load_type(ld2));
    call routine_name(ld1, ld2);
```

Examples of routine_name(ld1, ld2) are provided in connection with Examples 11–48, below. The routine examples in connection with Examples 11–48 may be examples of cases in which there is only one covering load. In Example 8, id1 may represent a single covering loads or a set of covering loads.

Under one implementation of the invention, a matrix is used to hold identifiers for combinations of loads. An example of a comprehensive load combination matrix is defined in Example 9, where in one implementation, the vertical column of load types represents the redundant load and the horizontal row of load types represents the set of covering loads. For example, R_A is an identifier at the intersection of regular load and advanced load, and represents the combination of regular and advanced load. In the implementation described in detail herein, the regular load is in the set ld1 and the advanced load is ld2, although that is not required. (A load combination matrix may have fewer entries or types of loads in which case it would not be a comprehensive load combination matrix.) The entry location (i, j) in the matrix is the name of the routine called by Do_Elimination where load_type[ld1] is i, and load_type[ld2] is j.

EXAMPLE 9

8/25 Comprehensive load combination matrix

| Load Type | regular load | advanced load | check load | check advanced load | speculative load | speculative advanced load |
|---|---|---|---|---|---|---|
| regular load | R_R | R_A | R_C | R_CA | R_S | R_SA |
| advanced load | A_R | A_A | A_C | A_CA | A_S | A_SA |
| check load | C_R | C_A | C_C | C_CA | C_S | C_SA |
| check advanced load | CA_R | CA_A | CA_C | CA_CA | CA_S | CA_SA |
| speculative load | S_R | S_A | S_C | S_CA | S_S | S_SA |
| speculative advanced load | SA_R | SA_A | SA_C | SA_CA | SA_S | SA_SA |

CRL_Elim( ) is a function for comprehensive redundant load elimination. In CRL_Elim( ), a load may be eliminated in connection with any of the 36 combinations of two types of loads (see Example 9). However, comprehensive redundant load elimination is only one example of redundant load elimination. In other examples of redundant load elimination, redundant loads may be eliminated in fewer than all 36 combinations. For example, under one alternative, if a matrix is used, the matrix could include fewer than all six types of loads in the vertical column and horizontal row. Under another alternative, the matrix could include all load types and the intersection of two loads would provide a routine name (as it does in Example 9), but one or more routines would merely include a return instruction (i.e., no actual code transformation is performed). Under yet another alternative, the matrix would include all six load types, but rather than call a routine name, a code at the intersection of the two loads could indicate that no redundant load is to be eliminated. Other implementations may be used. Certain implementations of redundant load elimination (whether or not comprehensive) may perform activities in addition to those described in detail herein. As examples, the identifiers at the intersections of loads may be symbols, commands (e.g., return or jump), or addresses to other locations in the code.

Figure 6:
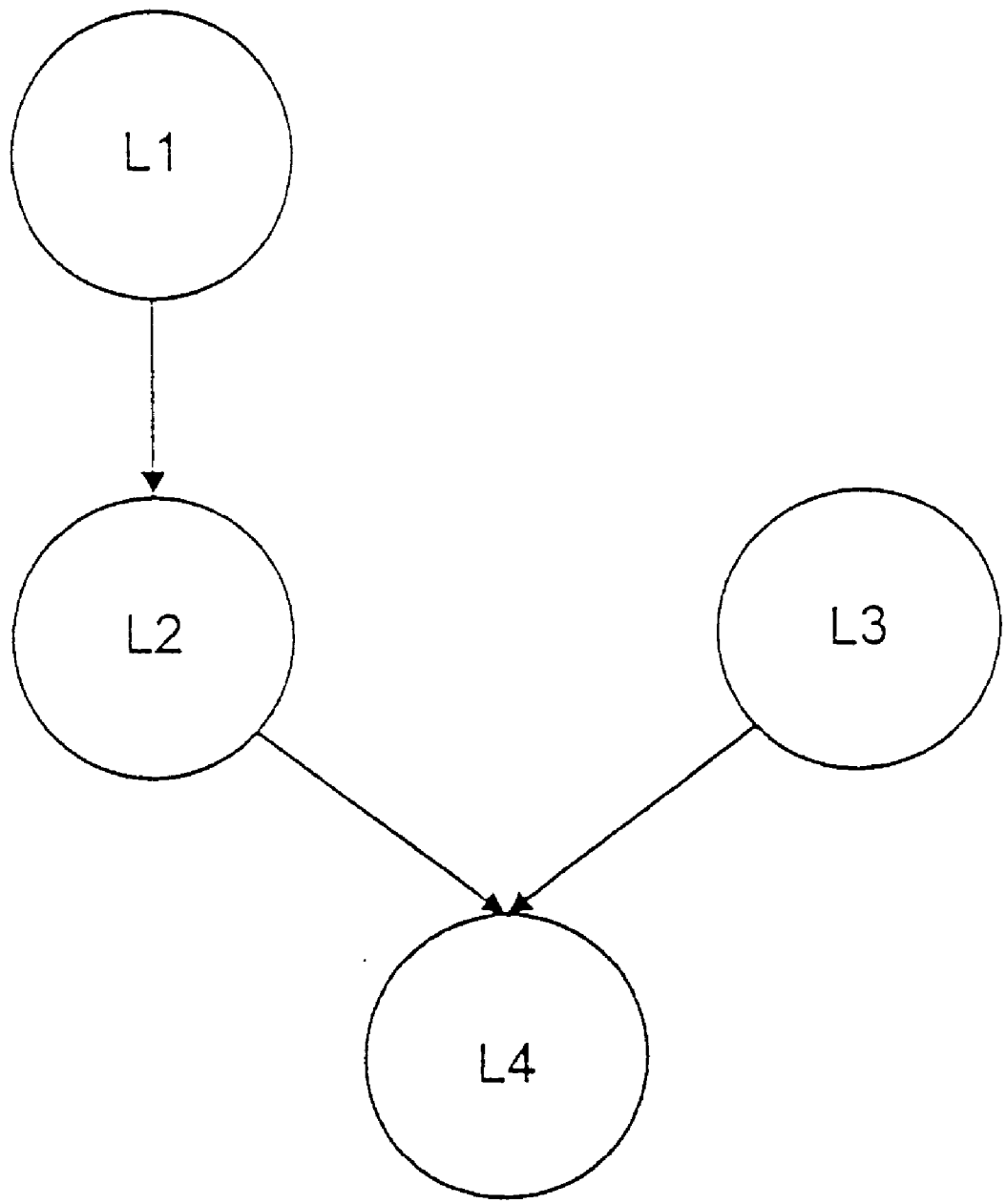
FIG. 6 is a flow graph illustrating covering and redundant loads.

FIG. 6 illustrates load L1, L2, L3, and L4, where L1, L2, and L3 are identified through available loads analysis as containing available load expressions with respect to load L4. However, under one implementation, initially, only L2 and L3 are covering loads with respect to L4. Therefore, initially, Do_Elimination({L2, L3}, L4) is invoked to eliminate/transform L4. L1 is a covering load with respect to L2. Therefore, following the elimination of L4, Do_Elimination({L1}, L2 ) is invoked. There are, of course, other implementations within the scope of the invention.

In the example of FIG. 6, it is assumed that L2 and L3 are of the same load type (e.g., both regular loads, both speculative advanced loads, etc.). Under one implementation, load elimination is not performed unless all covering loads are of the same load type. Under another implementation, load elimination may be performed although the covering loads are any combination of the six load types. Under a third implementation, load elimination may be performed if the covering loads include some combinations of load types, but not other combinations of load types. A reason to limit which covering load types may be involved with load elimination is that, because of the variety of possible combinations, it can add significantly to the complexity of the compiler.

In Examples 7 and 8, Do_Elimination (ld1, ld2) is shown as passing both ld1 and ld2. Alternatively, Do_Elimination and other functions could pass only ld2, and the covering loads of ld1 could be determined based from the available loads analysis and the code being compiled, through some means other than passing ld1 as an argument. Further, ld1 can include only one covering load at a time, rather than the entire set of multiple covering loads.

In some cases, and redundant loads may be passed to a routine function, but a load might not be eliminated by the routine. For instance, in Example 12(a), there will not be an elimination if the conditional "if" statement is not met. Reasons for not actually eliminating the redundant load include that it may lead to code that is incorrect and/or less efficient than the code was with the redundant load.

For each load operation ld: r=load [addr], dest(ld) represents the destination register r, and addr(ld) represents the load address. The size of the loaded value may be denoted size(op). Under one implementation, size(op) is used in connection with the ALAT. If the sizes in a comparison are not the same, there is no elimination. Under one implementation, to eliminate one of the redundant load operations ld1 and ld2, the situation where dest(ld2)!=dest(ld1) is considered to decide whether to remove or change a load to a copy. A utility routine Elim_A2_or_Copy_A1_to_A2(ld1, ld2) in Example 10A is defined, which eliminates ld2 if dest(ld2)=dest(ld1), or changes ld2 to a copy "dest(ld2)=dest(ld1)" otherwise.

EXAMPLE 10A

The Elim_A2_or_Copy_A1_to_A2 utility routine

Elim_A2_or_Copy_A1_to_A2(ld1, ld2)
    if ( dest(ld2) == dest(ld1))
        Eliminate (ld2)
    else
        change ld2 to the copy instruction "dest(ld2) = dest(ld1)"

A utility routine Elim_A2 (ld1, ld2) in Example 10B is simpler than that of Example 10A, but serves the same purpose of eliminating the second argument passed to it. Other optimization can be performed to remove the copy instruction if it is desirable.

EXAMPLE 10B

The Elim_A2(ld1, ld2) utility routine

Elim_A2 (ld1, ld2)
    Eliminate (ld2);
    Add the copy instruction "dest(ld2) = dest(ld1)" in its place;

Various other elimination routines may be used. For example, the Example 10B could include a line of code "if (dest(ld1)!=dest(ld2))" making the line of code "dest(ld2)=dest(ld1)" conditional. In another implementation, the compiler could later remove the line of code "dest(ld2)=dest(ld1)" in the case in which dest(ld1)=dest(ld2) (e.g., code is r1=r1). In examples, below, the code refers to the Elim_A2_or_Copy_A1_to_A2 utility routine of Example 10A, but could instead use the routine of Example 10B or some other elimination routine.

D. Routines

The following provides examples of the routines identified by the comprehensive load combination matrix of Example 9. Note that the routines could be expressed differently. For example, when we have a choice of eliminating ld1 or ld2, we may eliminate the load with smaller execution frequency, rather than simply eliminating ld2. The copy instructions may be generated freely assuming that copy propagation or register coalescing will remove them if desirable. As mentioned, the following routines deal with only one covering load and one redundant load. The routines can be extended to cases of multiple covering loads where ld1 represents the set of multiple covering loads. Certain code of Examples 11–48 may be modified somewhat to handle this situation as will be apparent to those skilled in the art. After ld2 is eliminated, a covering load may become the next redundant load.

1. Regular load and regular load. (R_R) The R_R routine performs the same action as performed by traditional redundant load elimination. If the two loads are exactly the same, ld2 is eliminated. If the two loads send results to different registers, change ld2 to a copy from ld1's destination register to ld2's destination register. An example of the R_R routine is listed in Example 11(a) and an example of the change in code caused by the routine of Example 11(a) is shown in Example 11(b). In Example 11(b) (and in other examples below), the left hand side shows code before the transformation and the right hand side shows code after the transformation.

2. Regular load and advanced load. (R_A). The R_A routine does not remove the advanced load because its corresponding check load needs the ALAT entry entered by the advanced load. However, it can remove the regular load, when there is no use or definition of dest(ld2) between ld1 and ld2. Register renaming can be performed to remove the use and definition of dest(ld2) between Id1 and ld2. Note that the destination register of the advanced load should not change. The R_A routine is listed in Example 12(a) and an example of the change caused by the routine of Example 12(a) is shown in Example 12(b). As noted, the left hand side of Example 12(b) shows code before the transformation, and the right hand side shows the code after the transformation.

EXAMPLE 12

R_A

| (a) | (b) | |
|---|---|---|
| R_A(ld1, ld2) | r1 = load (addr) | r2 = adv_load (addr) |
|   if no use/def of dest(ld2) between ld1 and ld2 | use r1 | r1 = r2 |
|   move ld2 before ld1 |  | → use r1 |
|   Elim_A2_or_Copy_A1_to_A2(ld2, ld1) | . . . | . . . |
|  | r2 = adv_load (addr) |  |

In Example 12(a), the phrase use/def of dest(ld2) means use of dest(ld2) or definition of dest(ld2). An example of a definition of dest(ld2) is r2=r3+r4. If the condition in Example 12(a) is not met, the load is not eliminated.

Example 12(b) illustrates an example of the second technique for eliminating a redundant load referred to above. From one viewpoint, the redundant load (adv_load (addr)) is moved and the covering load (load (addr)) is eliminated. From another viewpoint, the redundant load is eliminated and the covering load is modified. Under either perspective, the redundant load is eliminated by no longer being in its position and there is one fewer load in the code.

3. Regular load and check load. (R_C). Because the regular load may be more expensive than the check load, the R_C routine first tries to remove the regular load. This is possible when there is no use or definition of dest(ld2) between ld1 and ld2. If the regular load can not be removed, the check load can be removed if ld2's advanced load is not between ld1 and ld2. This may replace a check load with a copy. For some architecture in which that a check load has shorter latency than a copy, this may not seem beneficial. However, a check load may miss ALAT and generate a recovery. If it can be determined that the check_load will never generate a recovery, then the check load should not be replaced by a copy. The R_A routine is listed in Example 13(a) and an example of the effect of the transformation is shown in Example 13(b). The routine Try_remove_check_load(ld1, ld2) in Example 13(a) chooses between a copy and a check load.

EXAMPLE 11

R_R

| (a) | (b) | |
|---|---|---|
| R_R(ld1, ld2) | r1 = load (addr) | r1 = load (addr) |
|   Elim_A2_or_Copy_A1_to_A2(ld1, ld2) | . . . | . . . |
|  | r2 = load(addr) | r2 = r1 |

EXAMPLE 13

R_C (a)

```
R_C(ld1,ld2)
  if no def or use of dest(ld2) between ld1 and ld2
    move ld2 before ld1
    Elim_A2_or_Copy_A1_to_A2(ld2, ld1);
  Else
    Try_remove_check_load(ld1, ld2)
Try_remove_check_load(ld1, ld2)
  if (ld2's advanced load is not between ld1 and ld2
    &&
    (dest(ld1) == dest(ld2) || ld2 may miss ALAT))
      Elim_A2_or_Copy_A1_to_A2(ld1, ld2);
```

(b)

```
r1 = load (addr)        r2 = check_load (addr)
use r1                  r1 = r2
...                   → use r1
r2 = check_load (addr)  ...
```

4. Regular load and check advanced load. (R_CA). The R_CA routine is similar to the R_C routine. If the regular load cannot be removed, the check advanced load can still be eliminated if there is no other check load depending on the implicit advanced load (this is often the case). The R_CA routine is shown in Example 14(a), and a transformation example is shown in Example 14(b) that removes the regular load.

EXAMPLE 14

R_CA (a)

```
R_CA (ld1, ld2)
  if no def or use of dest(ld2) between ld1 and ld2
    move ld2 before ld1
    Elim_A2_or_Copy_A1_to_A2(ld2, ld1);
  else
  if (ld2's advanced load is not between ld1 and l2
    and ld2 is the only check of the adv_load)
      Elim_A2_or_Copy_A1_to_A2(ld1, ld2);
```

(b)

```
r1 = load (addr)            r2 = check_adv_load (addr)
use r1                      r1 = r2
...                       → use r1
r2 = check_adv_load (addr)  ...
```

5. Regular load and speculative load. (R_S) If the speculative check corresponding to the speculative load ever raises an exception, the speculative load will generate a deferred exception. However, the regular load accesses the same memory location and the exception will be raised by the regular load. Thus the speculative load and the speculative check are unnecessary and the speculative load and its speculative check operations can be eliminated. The R_S routine is shown in Example 15(a) and a transformation example is shown in Example 15(b).

EXAMPLE 15

R_S (a)

```
R_S(ld1, ld2)
  Elim_A2_or_Copy_A1_
    to_A2(ld1, ld2)
  remove ld2's spec_check
    operations if it has
    no other corresponding
    spec_load
```

(b)

```
r1 = load (addr)       r1 = load (addr)
use r1                 use r1
...                  → ...
r2 = spec_load (addr)  r2 = r1
..
spec_check r2          /*removed*/
```

6. Regular Load and Speculative Advanced Load. (R_SA) The R_SA routine should not remove the speculative advanced load because its corresponding check load needs the ALAT entry entered by the speculative advanced load. However, the regular load can be removed if the speculative advanced load can be moved before the regular load. When the regular load is removed, the speculative advanced load should be changed to an advanced load as any exception should be raised right on the spot. The R_SA routine is shown in Example 16(a) and a transformation example is shown in Example 16(b).

EXAMPLE 16

R_SA (a)

```
R_SA (ld1, ld2)
  if no use/def of dest(ld2)
    between ld1 and ld2
    move ld2 before ld1
    change ld2 to advanced
      load
    Elim_A2_or_Copy_
      A1_to_A2(ld2, ld1)
```

(b)

```
r1 = load (addr)        r2 = adv_load
use r1                    (addr)
  →                     r1 = r2
...                     use r1
r2 = spec_adv_load      ...
  (addr)
```

7. Advanced load and regular load. (A_R) The A_R routine can remove the regular load. The A_R routine is shown in Example 17(a) and a transformation example is shown in Example 17(b).

EXAMPLE 17

A_R

```
A_R (ld1, ld2)            r1 = adv_load     r1 = adv_load
  Elim_A2_or_Copy_A1_to_A2  (addr)            (addr)
  (ld1, ld2)              use r1            use r1
                          ...             → ...
                          r2 = load (addr)  r2 = r1
```

8. Advanced load and advanced load. (A_A) Two advanced loads with the same size and from the same address can be replaced by a single advanced load. A complicating fact is that an advanced load and its check loads should have the same destination register. When eliminating one of the advanced loads, its corresponding check loads should be changed to check the destination for the other advanced load. Assume the two advanced loads and the check loads are used as in Example 18.

EXAMPLE 18

| Sample code | |
|---|---|
| R1 = adv_load | [addr] |
| use r1 | |
| r2 = adv_load | [addr] |
| store *p | |
| r1 = check_load | [addr] |
| uses r1 | |
| store *q | |
| r2 = check_load | [addr] |
| uses r2 | |

If r1 and r2 are the same, the second advanced load can simply be removed. Otherwise, the second advanced load is eliminated and the following actions are performed.
1. Change the second advanced load to a copy
2. Change the check load of r2 to a check load of r1 and add a copy r2=r1 after the check
3. If r1 is used after the check_load for r2, insert "r1_new= r1" right before the check_load, and let all the uses of r1 after the check load to use r1_new. This is needed because the check_load for r2 is changed to a check load for r1, which may destroy the original value of r1.

The A_A routine is shown in Example 19 and a transformation example is shown in Example 20.

EXAMPLE 19

| A_A |
|---|
| A_A (ld1, ld2) |
|   if dest(ld1)!= dest(ld2) |
|     change ld2 to a copy "dest(ldw) = dest(ld1)" |
|     change ld2's check load to check dest(ld1) |
|     if dest(ld1) is defined or used after ld2's check load |
|       r1_new = new virtual register( ) |
|       insert r1_new = dest(ld1) before ld2's |
|         check load |
|       change uses of dest(ld1) after ld2's check load to |
|         use r1_new |
|   else |
|     Eliminate (ld2) |

EXAMPLE 20

| A_A | | | | |
|---|---|---|---|---|
| r1 = adv_load | [addr] | r1 = adv_load | [addr] |
| use r1 | | use r1 | |
| r2 = adv_load | [addr] | r2 = r1 | |
| uses r1 | → | uses r1 | |
| store *p | | store *p | |
| r1 = check_load | [addr] | r1 = check_load | [addr] |
| uses r1 | | uses r1 | |
| store *q | | store *q | |
| r2 = check_load | [addr] | r1_new = r1 | |
| uses r2 | | r1 = check_load | [addr] |
| uses r1 | | r2 = r1 | |
| | | uses r2 | |
| | | uses r1_new | |

9. Advanced load and check load. (A_C). The check load is unnecessary as the advanced load reloads the value for the check_load. So it can be removed. The A_C routine is shown in example 21(a) and a transformation example is shown in example 21(b).

EXAMPLE 21

| A_C | | |
|---|---|---|
| A_C (ld1, ld2) | r1 = adv_load (addr) | r1 = adv_load (addr) |
|   Try_remove_check_load(ld1, ld2); | use r1 | use r1 |
| | . . .   → | . . . |
| | r2 = check_load (addr) | r2 = r1 |
| (a) | | (b) |

10. Advanced load and check advanced load. (A_CA). This is same as the case for "advanced load and check load" (A_C) if there is no other check load for the same destination as ld2 (this is often the case). Otherwise, the implicit advanced load should not be removed as doing so will cause the check load to incur costly recovery. In this case, the routine is treated the same as "advanced load and advanced load" (A_A). The A_CA routine is shown in Example 22(a) and a transformation example is shown in Example 22(b).

EXAMPLE 22

| A_CA | | |
|---|---|---|
| A_CA (ld1, ld2) | $r_1$ = adv_load (addr) | r1 = adv_load (addr) |
|   if(ld2 has no other checks for its destination) | use r1 | use r1 |
|     A_C(ld1, ld2) | . . .   → | . . . |
|   else | r2 = check_adv_load (addr) | r2 = r1 |

EXAMPLE 22-continued

A_CA

| (a) | | (b) |
|---|---|---|
| A_A(ld1, ld2) | . . | r1_new = r1 |
| | r2 = check_load(addr) | r1 = check_load(addr) |
| | | r2 = r1 |
| | use r1 | use r1_new |

11. Advanced load and speculative load. (A_S). The advanced load will raise the exception that the speculative advanced load intended to defer. So the prefix "speculative" has no effect. This is the same as the case for "advanced load and regular load" (A_R). A transformation example is shown in Example 23.

EXAMPLE 23

A_S

| | | |
|---|---|---|
| r1 = adv_load (addr) | | r1 = adv_load (addr) |
| use r1 | | use r1 |
| . . . | → | . . . |
| r2 = spec_load (addr) | | r2 = r1 |
| use r2 | | use r2 |

12. Advanced load and speculative advanced load. (A_SA). The first advanced load will raise the exception that the speculative advanced load intended to defer. So the prefix "speculative" has no effect. This is the same as the case for "advanced load and advanced load" (A_A) (see section D.8). An example of A_SA elimination is shown in Example 24.

EXAMPLE 24

A_SA

| | | | |
|---|---|---|---|
| r1 = adv_load [addr] | | r1 = adv_load [addr] | |
| use r1 | | use r1 | |
| r2 = spec_adv_load [addr] | | r2 = r1 | |
| uses r1 | | uses r2 | |
| store *p | → | store *p | |
| r1 = check_load [addr] | | r1 = check_load | [addr] |
| uses r1 | | uses r2 | |
| store *q | | store *q | |
| r2 = check_load [addr] | | r1_new = r1 | |
| uses r2 | | r1 = check_load | [addr] |
| uses r1 | | r2 = r1 | |
| | | uses r2 | |
| | | uses r1_new | |

13. Check load and regular load. (C_R) The regular load can be removed as its value is available in the destination register of the check load. Also, if the regular load will cause an exception, the check load will have raised it. The C_R routine is shown in Example 25(a) and a transformation example is shown in Example 25(b).

EXAMPLE 25

C_R

| (a) | (b) | |
|---|---|---|
| C_R(ld1, ld2) | r1 = check_load (addr) | r1 = check_load (addr) |
| Elim_A2_or_Copy_A1_to_A2(ld1, ld2); | use r1 | use r1 |
| | | → |
| | . . . | . . . |
| | r2 = load (addr) | r2 = r1 |

14. Check load and advanced load. (C_A). The advanced load should not be removed. The check load can be removed if there is no reference of dest(ld2) between ld1 and ld2. The C_A routine is shown in Example 26(a) and a transformation example is shown in Example 26(b).

EXAMPLE 26

C_A

| (a) | (b) | |
|---|---|---|
| C_A (ld1, ld2) | r1 = check_load (addr) | r2 = adv_load (addr) |
| if (no def/use of dest(ld2) between ld1 and ld2) | | → r1 = r2 |
| move ld2 before ld1 | use r1 | use r1 |
| Elim_A2_or_Copy_A1_to_A2(ld2, ld1); | . . . | . . . |
| | r2 = adv_l (addr) | |

15. Check load and check load. (C_C). The second check load can be removed. The C_C routine is shown in Example 27(a) and a transformation example is shown in Example 27(b).

EXAMPLE 27

| C_C | | |
|---|---|---|
| C_C (ld1, ld2)<br>    Try_remove_check_load(ld1, ld2); | r1 = check_load (addr)<br>use r1<br>. . .<br>r1 = check_load (addr) | r1 = check_load (addr)<br>use r1<br>. . . |
| (a) | → | (b) |

16. Check load and check advanced load. (C_CA). The implicit advanced load is not needed if the check_adv_load has no other check loads for the same destination register, as the first check load already reloads the value. In this case it is the same as "check load and check load." If ld2 has other check loads, then they may expect the ALAT entry entered by the implicit advanced load. In this case it is the same as "check load and advanced load." The C_CA routine is shown in Example 28. For examples of C_A and C_C see Examples 26 and 27.

EXAMPLE 28

| C_CA |
|---|
| C_CA (ld1, ld2)<br>  if (ld2 has no other checks for its destination)<br>    C_C (ld1,ld2)<br>  else<br>    C_A (ld1, ld2) |

17. Check load and speculative load. (C_S) The check load will raise the exception that the speculative load intended to defer. So the speculative load can be removed. When removing the speculative load, its speculative check should be removed if it is dominated by the speculative load (remember that a load may be moved to several destination locations and they collectively dominate their spec_checks. The C_S routine is shown in Example 29(a) and a transformation example is shown in Example 29(b).

18. Check load and speculative advanced load. (C_SA). The check load will raise the exception that the speculative advanced load intended to defer. So the prefix "speculative" has no effect. This is the same as the case for "check load and advanced load" (C_A). A transformation example is shown in Example 30(b).

EXAMPLE 30

| C_SA | | |
|---|---|---|
| C_SA (ld1, ld2)<br>  C_A(ld1, ld2) | r1 = check_load (addr)<br>→<br>use r1<br>. . .<br>r2 = spec_adv_load (addr) | r2 = adv_load (addr)<br>r1 = r2<br>use r1<br>. . . |
| (a) | | (b) |

19. Check advanced load and regular load. (CA_R). The regular load can be removed as the value it intended to load is already available in dest(ld1). The CA_R routine is shown in Example 31(a) and a transformation example is shown in Example 31(b).

EXAMPLE 29

| C_S | | |
|---|---|---|
| C_S (ld1, ld2)<br>  Elim_A2_or_Copy_A1_to_A2(ld1, ld2);<br>  for each ld2's spec_check<br>    if (it is dominated by ld2)<br>      remove the spec_check | r1 = check_load (addr)<br>use r1<br>. . .<br>r2 = spec_load (addr)<br>. . .<br>spec_check r2 | r1 = check_load (addr)<br>use r1<br>. . .<br>r2 = r1 |
| (a) | → | (b) |

EXAMPLE 31

CA_R

| (a) | | (b) |
|---|---|---|
| CA_R(ld1, ld2) <br>   Elim_A2_or_Copy_A1_to_(ld1, ld2); | r1 = check_adv_load (addr) <br> use r1 <br> ... <br> r2 = load (addr) | r1 = check_adv_load (addr) <br> use r1 <br> ... <br> r2 = r1 |

20. Check advanced load and advanced load. (CA_A). When the check advanced load is the only check for its corresponding advanced load, the check advanced load can be removed without worrying about its effect on allocating an ALAT entry. Otherwise this will be the same as "advanced load and advanced load" since a check_adv_load can be replaced by an adv_load. The CA_R routine is shown in Example 32(a) and a transformation example for the first case is shown in Example 32(b).

EXAMPLE 32

CA_A

| (a) | (b) | |
|---|---|---|
| CA_A(ld1, ld2) <br>   if ld1's corresponding adv load has no other <br>     check_load and no def/use to dest(ld2) <br>     between ld1 and ld2) <br>     move ld2 before ld1 <br>     Elim_A2_or_Copy_A1_to_A2(ld2, ld1); <br> else <br>   A_A(ld1, ld2) | r1 = check_adv_load (addr) <br> use r1 <br> ... <br> r2 = adv_load (addr) | r2 = adv_load (addr) <br> r1 = r2 <br> → use r1 <br> ... |

21. Check advanced load and check load. (CA_C). When a store invalidates either of the check loads, both of them will be invalidated since their addresses are the same. However, in that case there should be only one recovery. The second check load can be removed, just as the case for "check load and check load". The CA_C routine is shown in Example 33(a) and a transformation example is shown in Example 33(b).

EXAMPLE 33

CA_C

| CA_C (ld1, ld2) <br> C_C (ld1, ld2) | r1 = check_adv_load <br> (addr) <br> use r1 <br> ... <br> r2 = check_load <br> (addr) | r1 = check_adv_load <br> (addr) <br> use r1 <br> ... <br> r2 = r1 |
|---|---|---|
| | (a) | (b) |

22. Check advanced load and check advanced load. (CA_CA). Check_adv_load can be safely replaced by an advanced load. So this routine can be done the same as "advanced load and check advanced load" to remove the second load, as in Example 34.

EXAMPLE 34

CA_CA

CA_CA (ld1, ld2)
A_CA (ld1,ld2)

In the case of CA_CA and A_CA, the same code can be used as the load elimination routine for both CA_CA and A_CA. There are at least three possible implementations for handling the situation in which the same code can be used in redundant load elimination in response to two different load combinations of a load elimination matrix. In a first implementation, one function calls another function (which is illustrated in Example 34). Note that the function A_CA is described in section D.10 above. In a second implementation, the routine of a second combination (e.g., A_CA) could include code that is the same as that of the routine of a first combination (e.g., CA_CA), so that it would be unnecessary to call the function of the second combination. In a third implementation, a single identifier is used in the intersection of both the first and second combinations so there is only one function called and only one set of code. Note that whether a particular combination is the first or the second combination may be arbitrary.

23. Check advanced load and speculative load. (CA_S). The routine for "advanced load and speculative load" routine (ASS) can be used to remove the speculative load, as Example 35.

EXAMPLE 35

CA_S

CA_S (ld1, ld2)
A_S (ld1,ld2)

24. Check advanced load and speculative advanced load. (CA_SA) The check load will raise the exception that the speculative advanced load intended to raise. So this is the same case as "check advanced load and advanced load," as in Example 36.

EXAMPLE 36

| CA_SA |
|---|
| CA_SA (ld1, ld2) |
| CA_A (ld1,ld2); |

25. Speculative load and regular load. (S_R). The speculative load can be removed if the regular load can be moved to the place of the speculative load. Otherwise, the regular load can be replaced with a speculative check followed by a copy. Also, any speculative check of the speculative load that is dominated by the new speculative check can be removed. The S_R routine is shown in Example 37(a) and a transformation example is shown in Example 37(b).

EXAMPLE 37

S_R

| (a) | (b) | |
|---|---|---|
| SR(ld1, ld2)<br>  if (no def/use of dest(ld2) between ld1 and ld2)<br>    move ld2 to before ld1<br>    Elim_A2_or_Copy_A1_to_A2(ld2, ld1);<br>    remove the spec_check for ld1<br>  else if (dest(ld1) is not changed between ld1 and ld2)<br>    Elim_A2_or_Copy_A1_to_A2(ld1, ld2);<br>    insert "spec_check dest(ld1)" before ld2<br>    remove ld1's spec_check dominated by ld2 | r1 = spec_load (addr)<br>use r1<br>. . .<br>r2 = load (addr) | r2 = spec_load (addr)<br>use r1<br>. . .<br>spec_check r1<br>r2 = r1 |

26. Speculative load and advanced load. (S_A). The advanced load should not be removed. The speculative load and its spec_check can be removed if the advanced load can be moved before the speculative load. The S_A routine is shown in Example 38(a) and a transformation example is shown in Example 38(b).

EXAMPLE 38

S_A

| (a) | (b) | |
|---|---|---|
| S_A(ld1, ld2)<br>  if (no def/use of dest(ld2) between ld1 and ld2)<br>    move ld2 to before ld1<br>    Elim_A2_or_Copy_A1_to_A2(I(ld2, ld1);<br>    remove the spec_check for ld1 | r1 = spec_load (addr)<br><br>use r1<br>. . .<br>r2 = adv_load (addr) | r2 = spec_adv_load (addr)<br>→ r1 = r2<br>use r1<br>. . .<br>spec_check r1 |

27. Speculative load and check load. (S_C). S_R could be used to remove either the speculative load or the check load. However, removing the check load this way will change it to a spec_check and a move. The spec_check and a move may be more expensive than the check load. It may be desirable to only try to remove the speculative load. The S_C routine is shown in Example 39(a) and a transformation example is shown in Example 39(b).

EXAMPLE 39

S_C

| (a) | (b) | |
|---|---|---|
| S_C (ld1,ld2)<br>  if (no def/use of dest(ld2) between ld1 and ld2)<br>    move ld2 to before ld1 | r1 = spec_load (addr)<br>→ r1 = r2<br>use r1 | r2 = check_load (addr)<br><br>use r1 |

EXAMPLE 39-continued

S_C

| (a) | (b) |
|---|---|
| Elim_A2_or_Copy_A1_to_A2(ld2, ld1); <br> remove the spec_check for ld1 | ... <br> r2 = check_load (addr) <br> ... <br> /* deleted */ |
| spec_check r1 | |

28. Speculative load and check advanced load. (S_CA). This is the same as the case for "speculative load and check load." A sample S_CA routine is shown in Example 40.

EXAMPLE 40

S_CA

S_CA (ld1, ld2)
S_C (ld1,ld2)

29. Speculative load and speculative load. (S_S). One of the speculative loads together with its speculative checks can be removed. The second one is removed. The S_S routine is shown in Example 41.

EXAMPLE 41

S_S

S_S (ld1, ld2)
Elim_A2_or_Copy_A1_to_A2 (ld2, ld1);

30. Speculative load and speculative advanced load. (S_SA). The speculative advanced load should not be removed due to its effects on ALAT. The speculative load can be removed as in the case for "speculative load and advanced load." The S_SA routine is shown in Example 42(a) and a transformation example is shown in Example 42(b).

EXAMPLE 42

S_SA

| (a) | (b) |
|---|---|
| S_SA (ld1, ld2) <br> S_A(ld1, ld2) | r1 = spec_load (addr) <br> → <br> use r1 <br> ... <br> r2 = spec_adv_load (addr) <br> .. <br> spec_check r1 <br> ... | r2 = spec_adv_load (addr) <br> r1 = r2 <br> use r1 <br> ... <br> <br> <br> /*deleted*/ |

31. Speculative advanced load and regular load. (SA_R). The exception deferred by the speculative advanced load is re-generated by a check load. If the check load is not between the two loads, the speculative prefix is not needed as the regular load will raise the exception. So this case is the same as "advanced load and regular load" plus a spec-check is added when the regular load is removed. The case when the check load is between ld1 and ld2 should not happen since an advanced load and its check load should be separated by an aliased invalidating operation (such as a call or a store). The SA_R routine is shown in Example 43(a) and a transformation example is shown in Example 43(b).

EXAMPLE 43

SA_R

| (a) | | (b) |
|---|---|---|
| SA_R (ld1, ld2) <br> if (the check load of ld1 <br> is not between ld1 and <br> ld2) <br> A_R(ld1, ld2) <br> add a "spec_check <br> dest(ld2)" | r1 = spec_adv_load <br> (addr) <br> → <br> use r1 <br> ... <br> r2 = load (addr) | r1 = spec_adv_load <br> (addr) <br> use r1 <br> ... <br> r2 = r1 <br> spec_check r2 |

32. Speculative advanced load and advanced load. (SA_A). This is similar to A_A if the check load of the speculative advanced load is not between ld1 and ld2 and it post-dominates the advanced load. In this case, the speculative prefix is not needed as the advanced load will raise the exception, and it thus becomes the same as "advanced load and advanced load." The SA_A routine is shown in Example 44.

EXAMPLE 44

SA_A

SA_A (ld1, ld2)
  if (the check load of ld1 is not between ld1 and ld2 and
    the check load of ld1 post-dominates ld2)
    A_A(ld1, ld2)

33. Speculative advanced load and check load. (SA_C). If the advanced load for thecheck load is not between the two loads, the advanced load should dominate both the speculative advanced load and the check load. If the speculative advanced load would generate a deferred exception, the exception would also be generated by the advanced load or it is not important to generate (e.g. a page fault exception). So the "speculative" prefix is not really needed. This case becomes A_C. The SA_C routine is shown in Example 45.

EXAMPLE 45

SA_C

SA_C (ld1, ld2)
  A_C(ld1, ld2)

34. Speculative advanced load and check advanced load. (SA_CA). This is the same as advanced load and check advanced load. See Example 46.

EXAMPLE 46

SA_CA

SA_CA (ld1, ld2)
  A_CA(ld1, ld2)

35. Speculative advanced load and speculative load. (SA_S). The speculative load can always be removed. The SA_S routine is shown in Example 47.

EXAMPLE 47

SA_S

| (a) | (b) | |
|---|---|---|
| SA_S (ld1, ld2)<br>  Elim_or_Copy_A1_to_A2(ld2, ld1); | r1 = spec_adv_load (addr)<br>use r1<br>. . .<br>r2 = spec_load (addr)<br>. . .<br>spec_check r2 | → | r1 = spec_adv_load (addr)<br>use r1<br>. . .<br>r2 = r1<br><br>spec_check r2 |

36. Speculative advanced load and speculative advanced load. (SA_SA). The second speculative advanced load can be removed by changing all the check load of the second load to check the destination register of the first load. Temporary register may be needed when the lifetimes of the two destination registers are overlapping. The procedure is the same as A_A. The SA_SA routine is shown in Example 48(a) and a transformation example is shown in Example 48(b).

EXAMPLE 48

SA_SA

| (a) | (b) | |
|---|---|---|
| SA_SA (ld1, ld2)<br>  A_A(ld1, ld2); | r1 = spec_adv_load (addr)<br>. . .<br>r2 = spec_adv_load (addr)<br>..<br>r2 = check_load(addr)<br>use r1 | | r1 = spec_adv_load (addr)<br>. . .<br>r2 = r1<br><br>r1_new = r1<br>r1 = check_load(addr)<br>r2 = r1<br>use r1_new |

The preceding discussion provides example routines for each of the 36 combinations of the 6 types of loads. However, in a particular implementation, one of the routines could merely be to return without elimination of a load. Alternatively, the intersection of a combination in the matrix could be another instruction that does not result in an elimination. One reason for doing so it that certain combinations of loads could be so rare as not to justify the code for eliminating the redundant load in that situation.

E. Additional Information

The routine Do_Elimination function can be incorporated into various traditional redundant load elimination techniques to handle data and control speculative loads and check loads.

Code performing the functions or other activities of the invention may be stored on a machine readable medium such as memory 14 in FIG. 1. As merely examples, the code may be stored and transported on a disk, such as a CD-ROM, or be stored on a hard drive. The code can also be transmitted over conductors, such as through a modem.

The term "act" refers generally to an activity performed by the computer.

The term "function" is used above in the sense of computer science function (e.g., code being called by a call statement and including a return statement). However, the term function is intended to be interpreted more broadly and may include procedures (another computer science term) as well as more divergent code. For example, the compiler may perform the functions described therein through object oriented structures which are not classical functions in restrictive computer science terminology.

Of course, a compiler according to the present invention may perform a variety of other functions in addition to those described herein and may be used in conjunction with other software.

If the specification states a particular event, activity, or feature "may", "can", "could", or "might" be included or have a characteristic, that particular event, activity, or feature is not required to be included or have the characteristic.

A control flow graph may be a tree type control flow graph with many leaves. The global scheduler may speculatively move many loads from leaves blocks to blocks at a function entry. The redundant loads may be removed in conjunction with classical optimization (common subexpression elimination, dead code elimination, etc.).

While the invention is susceptible to various modifications and alternative forms, specific embodiments thereof have been shown by way of example in detail herein. Those skilled in the art having the benefit of this disclosure will appreciate that many variations from the foregoing description and drawings may be made within the scope of the present invention. Accordingly, it is the following claims including any amendments thereto that define the scope of the invention.

What is claimed is:

1. A computer implemented method used in compiling a program, comprising:

identifying a set of covering loads including at least one covering load having a first load type and a redundant load having a second load type, wherein the first load type and the second load type each may be one of a group of load types including a regular load and at least one speculative-type load, wherein at least one of the covering and redundant loads is a speculative-type load; and selectively eliminating the redundant load.

2. The method of claim 1, wherein the speculative-type loads include advanced load, check advanced load, speculative load, and speculative advanced load.

3. The method of claim 1, wherein the identification of the set of covering loads and the redundant load is performed globally over a function.

4. The method of claim 1, wherein the identification of the set of covering loads involves determining the intersection of loads from different blocks.

5. A computer implemented method used in compiling a program, comprising:

identifying a covering load having a first load type and a redundant load having a second load type, wherein the first load type and the second load type each may be one of a group of load types including a regular load, at least one speculative-type load, and at least one check-type load, wherein at least one of the covering and redundant loads is a speculative-type load; and selectively eliminating the redundant load.

6. The method of claim 5, wherein the redundant load is selectively eliminated because depending on the combination of the first and second load types, the redundant load is eliminated if certain conditions are met.

7. The method of claim 5, wherein the redundant load is selectively eliminated because depending on the combination of the first and second load types, the redundant load is not eliminated under any conditions.

8. The method of claim 5, wherein the group of load types includes regular load, advanced load, check load, check advanced load, speculative load, and speculative advanced load.

9. The method of claim 5, wherein more than one covering load is identified if additional covering loads exist.

10. The method of claim 5, wherein the identification of the covering and redundant load is performed globally over a function.

11. The method of claim 5, wherein more than one covering load is identified and each covering load has the first load type.

12. The method of claim 5, wherein the first load type is a regular load and the second load type is a speculative advanced load.

13. The method of claim 5, wherein the check-type loads include check load and check advanced load.

14. The method of claim 5, wherein eliminating the redundant load includes completely eliminating the redundant load from code of the program.

15. The method of claim 5, wherein eliminating the redundant load includes eliminating the redundant load from its position in code of the program and moving to another position in the code.

16. A machine readable medium having stored thereon instructions, which when processed by a processor, cause the processor to perform acts including:

identifying a covering load having a first load type and a redundant load having a second load type, wherein the first load type and the second load type each may be one of a group of load types including a regular load, at least one speculative-type load, and at least one check-type load, wherein at least one of the covering and redundant loads is a speculative-type load; and selectively eliminating the redundant load.

17. The medium of claim 16, wherein the group of load types includes regular load, advanced load, check load, check advanced load, speculative load, and speculative advanced load.

18. A computer implemented method used in compiling a program, comprising:

identifying a covering load having a first load type and a redundant load having a second load type at particular stages globally over a function, wherein the first load type and the second load type each may be one of a group of load types including a regular load and at least one speculative-type load, wherein at least one of the covering and redundant loads is a speculative-type load; and selectively eliminating the redundant load.

19. The method of claim 18, wherein the first load type and the second load type each may be one of a group of load types including a regular load, at least one speculative-type load, and at least one check-type load.

20. A method of load elimination in compiling a program, comprising:

deriving a routine name from a first load type and a second load type; and performing a routine selected according to the routine name wherein a load is eliminated.

21. The method of claim 20, wherein the routine may call another routine.

22. The method of claim 20, wherein the deriving the routing name includes providing the first and second load types to a load combination matrix.

23. The method of claim 22, wherein the deriving the routine name includes identifying the routine name at an intersection of the first and second load types in the load combination matrix.

24. The method of claim 22, wherein the load combination matrix is a comprehensive load combination matrix.

25. The method of claim 20, wherein at identifier at an intersection of the first and second load types is a memory address of the routine name.

26. The method of claim 20, wherein for some combinations of first and second load types, the routine merely includes a return statement.

27. The method of claim 20, wherein at least one of the first and second load types is speculative load type.

28. A machine readable medium having stored thereon instructions, which when processed by a processor, cause the processor to perform acts including:

deriving a routine name from a first and a second load type; and performing a routine selected according to the routine name wherein a load is eliminated.

29. The medium of claim 28, wherein the routine involves accessing a load combination matrix.

30. The medium of claim 28, wherein the matrix is a comprehensive load combination matrix.

31. The medium of claim 28, wherein at least one of the first and second load types is speculative load type.

32. A machine readable medium having stored thereon instructions, which when processed by a processor, cause the processor to perform acts including:

identifying a set of covering loads including at least one covering load having a first load type and a redundant load having a second load type, wherein the first load type and the second load type each may be one of a group of load types including a regular load and at least one speculative-type load, wherein at least one of the covering and redundant loads is a speculative-type load; and selectively eliminating the redundant load.

33. The medium of claim 32, wherein the speculative-type loads include advanced load, check advanced load, speculative load, and speculative advanced load.

34. The medium of claim 32, wherein the identification of the set of covering loads and the redundant load is performed globally over a function.

35. The medium of claim 32, wherein the identification of the set of covering loads involves determining the intersection of loads from different blocks.

* * * * *